Aug. 6, 1935.  R. B. CHILLAS, JR  2,010,010
APPARATUS FOR CONTACTING LIQUIDS WITH VAPORS OR GASES
Filed May 20, 1933  2 Sheets-Sheet 1

Inventor

Richard B. Chillas, Jr.

By T. Wallace Quinn
his Attorney

Aug. 6, 1935.  R. B. CHILLAS, JR  2,010,010
APPARATUS FOR CONTACTING LIQUIDS WITH VAPORS OR GASES
Filed May 20, 1933  2 Sheets-Sheet 2

Inventor
Richard B. Chillas, Jr.
By T. Wallace Quinn
his Attorney

Patented Aug. 6, 1935

2,010,010

UNITED STATES PATENT OFFICE 2,010,010

APPARATUS FOR CONTACTING LIQUIDS WITH VAPORS OR GASES

Richard B. Chillas, Jr., Philadelphia, Pa., assignor to The Atlantic Refining Company, Philadelphia, Pa., a corporation of Pennsylvania Application May 20, 1933, Serial No. 671,970

7 Claims. (Cl. 261—114)

The present invention relates to the art of contacting liquids and vapors or gases, and more particularly, relates to contacting liquids with vapors or gases such as is occasioned in the art of fractionation, for example, in the fractionation of petroleum or components thereof. Other operations where liquids and vapors or gases are contacted, such for example, as in the countercurrent scrubbing of a gas or vapor, the exchanges of heat between liquids and gases, absorption processes or the like, are also within the contemplation of my invention.

For the sake of clarity, the invention will be described in connection with fractionation of a composite fluid, having particularly in mind the fractionation of petroleum. From such description the advantages of my invention when applied to absorption or other processes wherein a liquid is contacted with a vapor or gas passed countercurrent thereto, as well as those advantages derived when the invention is applied to fractionation, will be apparent.

In the fractionation of petroleum or components thereof, as normally carried out in a fractionating tower or column having a series of fractionating zones located one above another, fractionation is dependent upon the contacting and interchange of heat between vapors and liquid, whereby the higher boiling components of the vapors are condensed and the lower boiling components of the liquid are revaporized, thereby to obtain a separation of components of the fluid on the basis of their boiling points. To obtain efficient fractionation there must be a thorough intermixing or contacting of the vapors with the liquid. That is, in the operation of a fractionating column, it is desirable to effect an intimate and uniform intermixing of the uprising vapors with the downflowing reflux liquid.

Considering any horizontal cross section of a column, and recognizing that the flow of gases or vapors is essentially always of a turbulent nature, thereby tending to maintain uniformity of distribution, the problem is to obtain a uniform and therefore an efficient intermixing of vapors with reflux liquir as the vapors pass upwardly, and to accomplish this a uniform distribution of the reflux liquid over the entire cross section is essential. My invention is primarily directed to a solution of such problem.

In operating fractionating columns, particularly fractionating columns of large diameters, considerable difficulty is encountered in obtaining a uniform distribution of reflux over the entire cross sectional area of the column. In the case of bubble plate columns, as a result of a slight departure of the plates from the horizontal, an uneven depth of reflux liquid over the surface of the plate, and an uneven proportioning of the vapors passing up through the liquid, occurs, so that more vapors rise through the portion of the plate where the layer of liquid is shallowest.

In the copending application of Horace M. Weir, Serial No. 558,046, filed August 19, 1931, there is disclosed a tower in which each fractionating zone comprises one or more series of overlapping panel members or louvers, spaced from one another and so arranged across the tower as to constitute a fractionating zone. Such contacting apparatus takes the place of the well known bubble plate. With such an arrangement, it is necessary to control carefully and accurately the levels and symmetry of the elements over which liquid flows through the zones of the tower to insure its even distribution, and hence the even distribution of vapors rising therethrough. It is incident to customary prior practice that over some portions of the series of panel members, a much greater amount of reflux liquid passes than over other similar portions in the same zone, thus causing a greater quantity of reflux liquid to be contacted with vapors in some portions of the zone than in others, thereby causing non-uniform fractionation throughout the zones, and hence inefficient fractionation. Similar or comparable problems of reflux distribution present themselves in the operation of other types of fractionating and/or contacting devices.

The accompanying drawings show apparatus which is an exemplary embodiment of my invention, wherein uniform distribution of liquid over the contacting elements of a fractionating zone is provided for.

Fig. 1 is an elevational view in section of a fractionating tower, equipped with successive series of panel plates or louvers, and having installed therein apparatus for providing a uniform distribution of reflux. Such apparatus comprises a system of troughs for collecting reflux liquid, and conduits for conducting same into a central collecting compartment, and a system of conduits and distributing troughs for substantially uniformly distributing the collected liquid from such compartment over the entire cross sectional area of the column.

Figure 1:
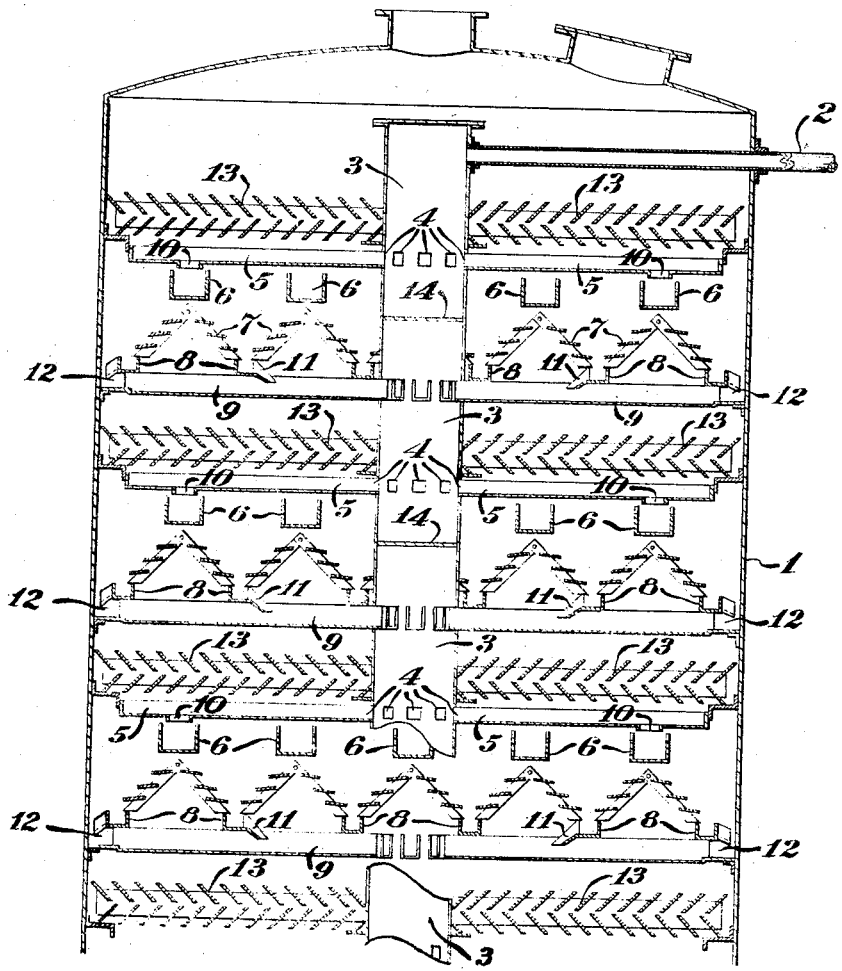

Referring more in detail to the drawings in which like numerals serve to designate corresponding parts in the several figures, 1 denotes a cylindrical tower containing a series of contacting or fractionating zones, one above another, as shown in Fig. 1. Reflux liquid is introduced into the tower, at a point adjacent the top thereof, through conduit 2 into the uppermost central collecting compartment 3, having a liquid tight bottom 14. Such liquid passes from the compartment 3 through apertures 4 which may be rectangular as shown, or of the V-notch or other type, into radial conduits 5, thence through openings 10 into distributing troughs 6, each of which is level. The liquid flows over the serrated edges of each trough 6 and uniformly distributes itself along the ridge or apex of a series of overlapping louvers or panel plates 7, grouped in the form of two wings, one being substantially the reflection of the other in a vertical axis of symmetry. Beneath the lower edge of each series of louvers there is a trough 8 which collects the downflowing reflux liquid and empties it into a radial conduit 9, either directly through outlets 11, or indirectly through circular trough 12. Conduits 9 carry the liquid into a second and lower central collecting compartment 3, from which liquid is passed through radial conduits and troughs associated therewith, and is uniformly distributed over the louvers of the next lower fractionating zone, and is then collected again in a lower central collecting compartment, and so on down the column.

Vapors of a composite fluid to be fractionated, are passed upwardly between panel plates 7 in the several fractionating zones of the column, and meet the uniformly distributed reflux flowing over such panel plates. The vapors ascending from plates 7, pass through baffling means such as plates 13, thereby to be freed from entrained liquid.

Figure 2:
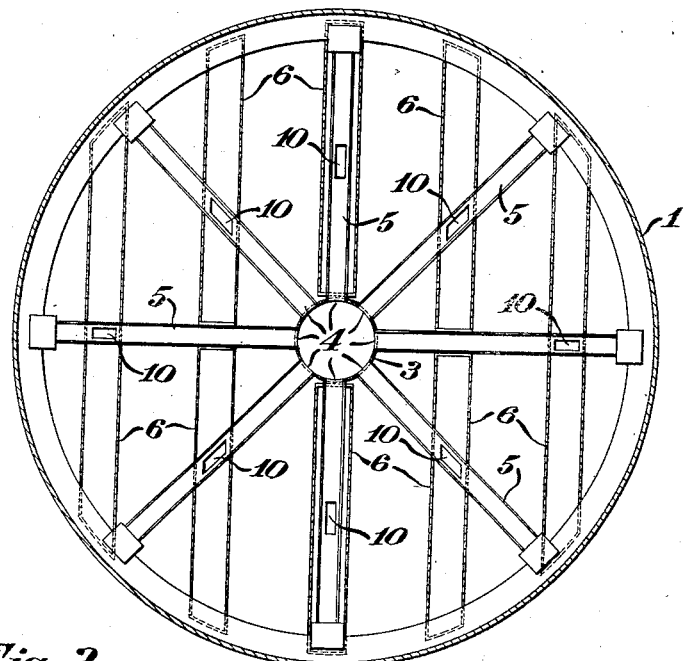
Fig. 2 shows in plan view radial conduits with troughs thereunder, for distributing reflux liquid from a central collecting compartment substantially uniformly over the entire cross sectional area of the column.

Fig. 2 of the drawings illustrates suitable apparatus for obtaining uniform distribution of reflux liquid over the cross-sectional area of the tower. Apertures 4, located at the several outlets from a central collecting compartment 3 to the respective radial conduits 5, are each adjusted to permit the proper proportion of the total reflux liquid, which corresponds with the proportion of the total cross sectional area of the tower to be served by such radial conduit, to flow thereinto. The size and shape of the apertures 4 are chosen of such proportions that they will carry an appreciable depth of liquid at minimum probable flows, yet never be completely filled at maximum probable flows. Each radial conduit 5 discharges through an opening 10 into a distributing trough 6, or section thereof. The openings 10 are all clearly shown in Fig. 2 for each trough 6. (In Fig. 1, no opening 10 to the troughs 6 closest to the central compartment can be seen in the sectional view, because such troughs are served by conduits 5, running at an angle to the plane of the section.) Each trough or section, as the case may be, is required to serve a certain section of contacting elements of a fractionating zone of the tower (corresponding to a definite part of the cross-sectional area of the tower) with reflux, and it will receive from the radial conduit which feeds it, that fraction of the total reflux of the column. The reflux overflows the serrated edges of troughs 6 and passes down over the series of overlapping panel plates 7, each plate being so designed or adjusted that liquid flowing over it will be deposited on the next lower plate, and so on, until it flows from the lowest panel plate of each series into a collecting trough 8, as can be seen from Fig. 1.

Figure 3:
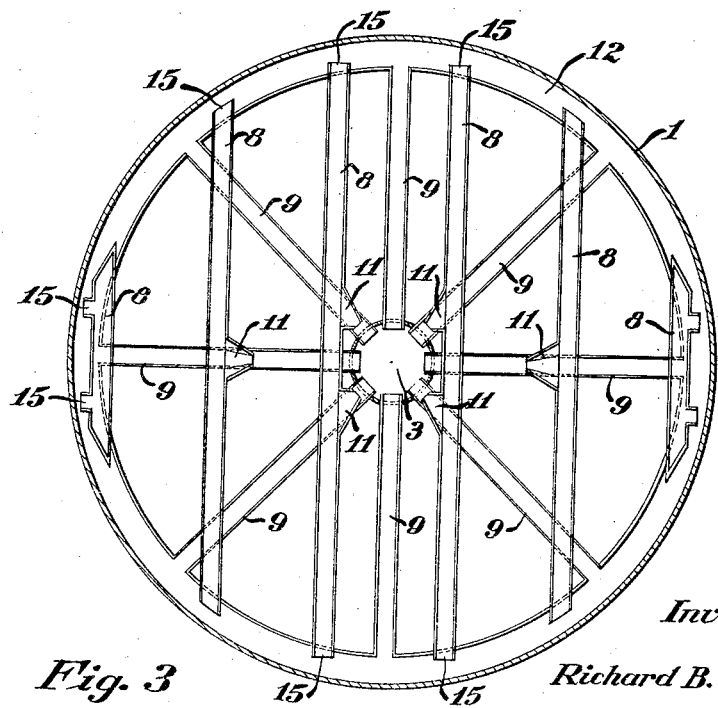
Fig. 3 shows in plan view troughs with radial conduits thereunder, for collecting reflux liquid and conducting it into a central collecting compartment.

Fig. 3 shows a system of troughs 8 for collecting reflux liquid. Liquid collected therein is discharged into radial conduits 9, either directly through outlets 11, or indirectly by passing through openings 15 into circular trough 12, located adjacent the wall of the tower 1, and thence into the radial conduits, from which it passes into a central collecting compartment 3.

I have found that by my invention substantially uniform distribution of reflux over a cross-section of the fractionating or contacting tower is obtained, and that channeling is eliminated in spite of slight or even fairly substantial deviations of the series of panel plates, or bubble plates, or equivalent contacting elements, as the case may be, from the precise horizontal or contemplated design; whereas, in the case of an ordinary fractionating tower, not equipped with my collection and distributing system or equivalent, reflux liquid will flow non-uniformly through a cross-sectional area of the tower if the panel plates, or bubble plates, are not precisely horizontal nor precisely in conformance with contemplated design, thereby impairing the desired intimacy and uniformity of contact of all portions of the ascending vapors with their proportionate share of descending liquid.

By collecting the reflux liquid from the bottom of each fractionating zone into a small collecting compartment, and then distributing the collected liquid from such compartment through a system of apertures and through a system of radial conduits and distributing troughs, I accomplish a substantially uniform distribution of reflux liquid regardless of whether or not bubble plates, or the several panel plates of a contacting system, or the equivalent, as the case may be, are horizontal or conform precisely to an equivalent contemplated design.

Departure of bubble plates, panel plates, or equivalent contacting apparatus from the contemplated position or design, usually comes from inaccuracies in construction, which are almost unavoidable, or from warping of parts, but may come from other causes such as actual tilting of the contacting tower from a vertical position. My small collecting compartments, which have a small cross-sectional area relative to the total cross-sectional area of the tower, and which are built into the tower, are subject to the same type of inaccuracies, but the effect of such is minimized by proper choice of the aperture proportions. In the preferred design of weir, the height of normal flow therethrough is such that the head of liquid is approximately equal to the length of crest. The height of the crest or bottom of the aperture is arranged sufficiently above the bottom of the trough into which it empties to compensate for or overcome inaccuracies in the placement of the trough.

The system of distributing and collecting the liquid from and in a central compartment in each fractionating zone is particularly advantageous in connection with the panel type of plate shown in the drawings. The liquid level above each horizontal partition or bottom 14 of each respective central compartment 3 in normal operation, is at an intermediate point in the apertures 4, and deviation of the member 3 from the vertical has slight effect upon the quantity of liquid flowing through each of the apertures. As a result, the supply of liquid to each of the distributing troughs 6 is substantially that for which apertures 4 were designed, despite slight deviations from the vertical. If the liquid be distributed onto the panel members of the topmost fractionating zone and be permitted to descend through the column without employing my invention, the panel plates being staggered so that liquid would fall from the lowermost panel of one series to the uppermost panel of the next lower series, any inaccuracies in the level of the series of panel members tend toward unequal distribution of reflux. Thus if the panel members slope in a longitudinal direction, the liquid in its passage downwardly would continually tend to flow in the direction of declination, so that in its descent through the column, the supply of liquid to the higher ends of the panel members would gradually become reduced or even entirely eliminated, while an excess of liquid would flow over the lower ends thereof. As a result, the amount of liquid brought into contact with the rising vapors would be unequal in different parts of each of the several fractionating zones, thus causing non-uniform and inefficient fractionation. However, by utilizing my system of distribution and collection of the reflux, the cumulative effect of inaccuracies is avoided, so that distribution is substantially uniform through the entire column.

For convenience in design, the collecting compartment is ordinarily located centrally of the tower. Liquid is apportioned therefrom into the several conduits, and from them into the several distributing troughs. By means of apertures, liquid passes from the central compartment to the several radial conduits. The crests of the several apertures are intentionally at the same elevation, in which case the heads of liquid inducing flow will be substantially uniform, but the shape and breadth of each aperture is controlled relative to the others in proportion to the area to be supplied with reflux liquid thereby. While the collection chamber need not be located in the center of the fractionating tower as shown, and the conduits leading thereto and therefrom need not necessarily be radial, such design is convenient and particularly adaptable in the design of columns adapted to withstand high external pressures, e. g., columns which are operated under a substantial vacuum. However, so far as my invention is concerned, the uniform distribution of reflux liquid over the cross-sectional area of the column might be obtained by having the small collecting compartment located at any point in the cross-sectional area of the column or even outside of the column, and by having conduits leading thereto and therefrom, from and to the several areas in the cross-section of the column, thereby to receive and uniformly feed reflux liquid to such areas. In designing a column for a given set of conditions, the size of apertures and dimensions of the collecting chamber are so chosen that at minimum probable flow of liquid, the effect of inaccuracies in distribution will be less than a predetermined amount.

My invention is not limited as to the number of conduits and troughs which may be employed to obtain uniform distribution of reflux over the cross-sectional area of the column. In general, the greater the number of distributing conduits, the more nearly uniform will be the distribution of reflux. However, there is a practical limit to the number of conduits and distributing troughs which would be desired. The accompanying drawings illustrate one suitable practical choice of number and arrangement of conduits and troughs.

Where my invention is adapted to a fractionating column of the bubble plate type, instead of having reflux liquid pass from one plate through a downflow pipe to a lower plate, and then across such plate to another downflow pipe leading to the next lower plate, through the path of least resistance, as is customary in column operation, by my arrangement liquid is withdrawn from the plate at one or more points and is conducted to a small collecting compartment from which it is distributed as desired over the several portions of the next succeeding lower plate. This distribution may be substantially uniform or may be controlled in any desired manner. The distribution over a plate such as a bubble plate, may be obtained in the absence of distributing troughs, if desired. For example, liquid may be carried from the collecting compartment by a plurality of conduits and deposited therefrom at a plurality of points spaced over the area of the plate. Liquid deposited at these points will spread over an adjacent area of the plate. However, a lesser degree of uniformity of distribution will be attained in this manner than where distributing troughs are employed. Other comparable adaptations of my invention with other types of contacting apparatus may be made wherever it is desired to obtain a uniform or controlled contacting of liquid with vapors and/or gas.

In the arrangement as shown and described, it will be seen that liquid, received or collected into a small compartment, is distributed therefrom in a controlled manner through a system of conduits and troughs over a contacting or fractionating zone of a tower, regardless of slight or even fairly substantial departure of the contacting elements from the precise design contemplated. Vapors or gases passing upwardly through a contacting zone are forced to pass through downflowing liquid, distributed in a uniform or controlled manner, thereby eliminating flow of vapor or gas through the paths of least resistance which may develop in a contacting apparatus in the absence of my invention or equivalent. Any system or arrangement of apparatus which will collect and distribute a liquid, uniformly, or in the contemplated manner, over a cross sectional area of a contacting zone which is adapted to permit vapors to rise therethrough, is contemplated as an equivalent of the structure herein shown for such purpose when it comes within the scope of the appended claims.

If desired, the apertures which allow liquid to flow from the collection chamber may be made adjustable. However, if initially they are each correctly designed or adjusted relative to the others in proportion to the respective fraction of cross-sectional area of the column which each is adapted to serve liquid, a uniform or contemplated distribution of liquid over the cross section of the column will be insured within practical limits. A variation of only 1 or 2%, or of that order, in the volume of liquid flowing down through one portion of the cross section of a tower compared with that flowing down through another portion of the same cross section of substantially the same area is, in general, of only slight significance; so that while the apertures may be made adjustable to even eliminate this slight unevenness of distribution, such adjustment would ordinarily not be employed.

It is to be understood that if it is desired to withdraw one or more side-streams from one or more of the fractionating zones of the column, valve controlled drawoff conduits may be provided leading from the collecting compartments to suitable points external to the column.

When in the appended claims, the terms "gas" and/or "gaseous" are employed, it is to be understood that such terms comprehend gases and/or vapors.

What I claim is:

1. In a liquid-gas contacting chamber provided with contacting devices adapted for passage of liquid downwardly and gaseous fluid at high velocity upwardly in countercurrent contact with the liquid, apparatus for distributing liquid to said contacting devices, which comprises a compartment of small horizontal cross-sectional area as compared with that of said chamber, the horizontal axis of said compartment being of substantially uniform length in all directions, means for supplying liquid to said compartment, a plurality of conduits extending from said compartment adapted to discharge liquid therefrom to a lower horizontal plane of said contacting chamber and above contacting devices disposed therein, a plurality of troughs of relatively small horizontal cross-sectional area as compared with that of said chamber disposed in a lower horizontal plane than the contacting devices last mentioned and adapted to receive liquid therefrom, and means for passing liquid from said troughs.

2. In a liquid-gas contacting chamber provided with contacting devices adapted for passage of liquid downwardly and gaseous fluid at high velocity upwardly in countercurrent contact with the liquid, apparatus for distributing liquid to said contacting devices, which comprises a compartment of small horizontal cross-sectional area as compared with that of said chamber, positioned centrally of said chamber, means for supplying liquid to said compartment, a plurality of conduits extending radially from said compartment, means associated with each of said conduits adapted to discharge liquid therefrom to a lower horizontal plane of said contacting chamber and above contacting devices disposed therein, a plurality of troughs of relatively small cross-sectional area as compared with that of said chamber disposed in a lower horizontal plane than the contacting devices last mentioned and adapted to receive liquid therefrom, and means for passing liquid from said troughs.

3. In a liquid-gas contacting chamber provided with contacting devices arranged one above the other and adapted for passage of liquid downwardly and gaseous fluid at high velocity upwardly in countercurrent contact with the liquid, apparatus for distributing liquid to said contacting devices, which comprises a compartment of small horizontal cross-sectional area as compared with that of said chamber, means for supplying liquid to said compartment, a plurality of apertures in said compartment adapted to discharge liquid therefrom, a plurality of conduits corresponding with said apertures and extending therefrom, an opening in each of said conduits adapted to discharge liquid therefrom to a lower horizontal plane of said contacting chamber and above contacting devices disposed therein, a plurality of troughs of relatively small horizontal cross-sectional area as compared with that of said chamber disposed in a lower horizontal plane than the contacting devices last mentioned and adapted to receive liquid from said devices, and means connecting said troughs in liquid flow relationship with a compartment of the distributing means for the contacting device next below.

4. In a liquid-gas contacting chamber provided with contacting devices arranged one above the other and adapted for passage of liquid downwardly and gaseous fluid at high velocity upwardly in countercurrent contact with the liquid, apparatus for distributing liquid to said contacting devices, which comprises a compartment of small horizontal cross-sectional area as compared with that of said chamber, means for supplying liquid to said compartment, a plurality of apertures in the side walls of said compartment adapted to discharge a predetermined quantity of liquid therefrom, a plurality of conduits corresponding with said apertures and extending therefrom, an opening in each of said conduits adapted to discharge liquid therefrom to a lower horizontal plane of said contacting chamber and above contacting devices disposed therein, a plurality of troughs of relatively small horizontal cross-sectional area as compared with that of said chamber disposed in a lower horiontal plane than the contacting devices last mentioned and adapted to receive liquid from said devices, and means connecting said troughs in liquid flow relationship with a compartment of the distributing means for the contacting device next below.

5. In a liquid-gas contacting chamber provided with a plurality of superimposed contacting devices adapted for passage of liquid downwardly and gaseous fluid at high velocity upwardly in countercurrent contact with the liquid, apparatus for distributing liquid to said contacting devices, which comprises a plurality of superimposed, separate compartments of small horizontal cross-sectional area as compared with that of said chamber, means for supplying liquid to the uppermost of said compartments, a plurality of conduits extending substantially horizontally from each of said compartments, means in each of the conduits adapted to discharge liquid therefrom to the contacting device disposed immediately therebelow, a plurality of troughs of relatively small horizontal cross-sectional area as compared with that of said chamber disposed in a lower horizontal plane than said contacting devices and adapted to receive liquid therefrom, and means connecting said troughs in liquid flow relationship with a compartment of the distributing means for contacting device next below.

6. In a liquid-gas contacting chamber provided with a plurality of contacting devices each consisting of a series of superimposed, vertically spaced, overlapping panels thru which gaseous fluid may pass at high velocity in countercurrent contact with freely-falling liquid descending over said panels, apparatus for uniformly disributing liquid to said contacting devices which comprises a compartment having a relatively small horizontal cross-sectional area as compared to that of said chamber, means for supplying liquid to said compartment, a plurality of conduits extending from said compartment, means in each of said conduits adapted to discharge liquid therefrom to a lower horizontal plane of said contacting chamber and above contacting devices disposed therein, a plurality of troughs of relatively small horizontal cross-sectional area as compared with that of said chamber, disposed below said contacting devices and adapted to receive liquid descending therefrom, and means for passing liquid from said troughs.

7. In a liquid-gas contacting chamber provided with a plurality of superimposed contacting devices adapted for passage of liquid downwardly and gaseous fluid at high velocity upwardly in countercurrent contact with the liquid, apparatus for distributing liquid to said contacting devices, which comprises a plurality of separate compartments disposed at different elevations in said contacting chamber, and being of small horizontal cross-sectional area as compared with that of said chamber, means for supplying liquid to the uppermost of said compartments, a plurality of conduits extending substantially horizontally from each of said compartments, means associated with the conduits adapted to discharge liquid therefrom to the contacting devices disposed therebelow, a plurality of troughs of relatively small horizontal cross-sectional area as compared with that of said chamber, disposed in a lower horizontal plane than said contacting devices and adapted to receive liquid therefrom, and means connecting said troughs in liquid flow relationship with a compartment of the distributing means for the contacting device next below.

RICHARD B. CHILLAS, Jr.